(12) United States Patent
Dronamraju et al.

(10) Patent No.: US 7,907,917 B1
(45) Date of Patent: Mar. 15, 2011

(54) METHOD AND SYSTEM FOR WIRELESS BRIDGING

(75) Inventors: Srirama Krishna Dronamraju, Overland Park, KS (US); Khalil Dahdouh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 11/848,835

(22) Filed: Aug. 31, 2007

Related U.S. Application Data (63) Continuation of application No. 10/316,689, filed on Dec. 10, 2002, now Pat. No. 7,299,060.

(51) Int. Cl.
*H04B 1/40* (2006.01)

(52) U.S. Cl. ... 455/74.1; 455/426.1; 455/74; 455/554.1; 455/554.2; 455/462

(58) Field of Classification Search ............... 455/416, 455/424, 426.1, 555, 460, 74, 74.1, 550.1, 455/554.1, 554.2, 462, 404.1, 552.1; 379/428.02; 370/260, 261, 262
See application file for complete search history.

(56) References Cited

U.S. PATENT DOCUMENTS

| | | | |
|---|---|---|---|
| 4,989,230 A | 1/1991 | Gillig et al. | |
| 5,127,042 A | 6/1992 | Gillig et al. | |
| 5,247,567 A | 9/1993 | Hirano | |
| 5,327,578 A | 7/1994 | Breeden et al. | |
| 5,442,680 A | 8/1995 | Schellinger et al. | |
| 5,528,666 A | 6/1996 | Weigand et al. | |
| 5,550,895 A | 8/1996 | Burson et al. | |
| 5,594,782 A | 1/1997 | Zicker et al. | |
| 5,619,553 A | 4/1997 | Young et al. | |
| 5,675,629 A * | 10/1997 | Raffel et al. ............... | 455/552.1 |
| 5,699,409 A | 12/1997 | Kojima et al. | |
| 5,758,290 A | 5/1998 | Nealon et al. | |
| 5,771,453 A | 6/1998 | Haartsen | |
| 5,774,805 A | 6/1998 | Zicker | |
| 5,809,417 A | 9/1998 | Nealon et al. | |
| 5,911,120 A | 6/1999 | Jarett et al. | |
| 5,999,823 A | 12/1999 | Yoneyama et al. | |
| 6,044,268 A | 3/2000 | Haartsen | |
| 6,078,822 A | 6/2000 | Tsujita | |
| 6,085,109 A | 7/2000 | Koga | |
| 6,091,758 A | 7/2000 | Ciccone et al. | |
| 6,122,502 A * | 9/2000 | Grundvig et al. .......... | 455/414.1 |
| 6,122,508 A | 9/2000 | Veloso | |
| 6,138,011 A | 10/2000 | Sanders et al. | |
| 6,141,547 A | 10/2000 | Rousseau et al. | |
| 6,141,562 A | 10/2000 | Eriksson | |
| 6,154,650 A | 11/2000 | Abidi et al. | |
| 6,167,278 A | 12/2000 | Nilssen | |
| 6,205,338 B1 | 3/2001 | Kim | |
| 6,226,515 B1 | 5/2001 | Pauli et al. | |
| 6,243,593 B1 | 6/2001 | Zicker | |
| 6,253,088 B1 | 6/2001 | Wenk et al. | |
| 6,289,089 B1 | 9/2001 | Rippstein | |
| 6,351,653 B1 | 2/2002 | Alberth et al. | |

(Continued)

*Primary Examiner* — Duc Nguyen
*Assistant Examiner* — Dominic E Rego (57) ABSTRACT

A wireless communication link is established between a mobile station and a landline station, independently of the landline and wireless telecommunications networks. The mobile station, while engaged in a call via a wireless telecommunications network, may wirelessly transmit a bridging signal to a transceiver, in order to include the landline station in the call independently of the landline telecommunications network. While the landline station is engaged in a call via the landline telecommunications network, the transceiver may wirelessly transmit a bridging signal to the mobile station, in order to include the mobile station in the call independently of the wireless telecommunications network.

3 Claims, 6 Drawing Sheets

U.S. PATENT DOCUMENTS

| | | | |
|---|---|---|---|
| 6,381,230 | B1 | 4/2002 | Wheatley et al. |
| 6,389,299 | B1 | 5/2002 | Park |
| 6,434,394 | B1 | 8/2002 | Grundvig et al. |
| 6,484,027 | B1 | 11/2002 | Mauney et al. |
| 6,611,692 | B2 | 8/2003 | Raffel et al. |
| 6,788,953 | B1 * | 9/2004 | Cheah et al. ............... 455/550.1 |
| 6,829,478 | B1 | 12/2004 | Layton et al. |
| 6,871,064 | B1 | 3/2005 | Holt et al. |
| 7,120,454 | B1 * | 10/2006 | Frank et al. .................. 455/462 |
| 7,299,060 | B1 | 11/2007 | Dronamraju et al. |
| 2001/0046215 | A1 | 11/2001 | Kim |
| 2002/0082000 | A1 * | 6/2002 | Sakai et al. .................... 455/414 |
| 2002/0094848 | A1 | 7/2002 | Amin et al. |
| 2002/0115455 | A1 | 8/2002 | Umstetter et al. |
| 2002/0115471 | A1 | 8/2002 | De Loye et al. |
| 2002/0198020 | A1 * | 12/2002 | Mooney ........................ 455/553 |
| 2003/0039242 | A1 | 2/2003 | Moore |
| 2003/0045235 | A1 * | 3/2003 | Mooney et al. ................ 455/41 |
| 2003/0045294 | A1 | 3/2003 | Kumar et al. |
| 2003/0139180 | A1 | 7/2003 | McIntosh et al. |
| 2003/0157929 | A1 * | 8/2003 | Janssen et al. ................ 455/416 |
| 2005/0130646 | A1 | 6/2005 | Frank et al. |

* cited by examiner

METHOD AND SYSTEM FOR WIRELESS BRIDGING

CROSS-REFERENCE TO RELATED APPLICATIONS

This is a continuation of application Ser. No. 10/316,689, filed Dec. 10, 2002, which application is incorporated herein by reference.

BACKGROUND

1. Field of the Invention

The present invention relates to telecommunications and, more particularly, to methods and systems for wirelessly bridging a mobile station with a landline station.

2. Description of Related Art

Most mobile stations have a two-line capability and can engage in three-way calling. Such three-way calling typically works as follows. A subscriber using a mobile station is engaged in a call with a first party, party A (who may be on either a landline station or a mobile station). The subscriber then places party A on hold, such as by pressing the "SEND" key on the mobile station, in order to try to connect a second party, party B. With party A on hold, the subscriber dials the telephone number of party B (who may be on either a landline station or a mobile station) using the mobile station's keypad. When party B answers, the subscriber is then able to join the two calls together within the mobile station, such as by pressing the "SEND" key. In this way, a subscriber engaged in a call with party A may add party B into the conversation.

One disadvantage with such three-way calling is that it requires additional resources of the wireless telecommunications network. For example, the network typically has to allocate a second wireless traffic channel in order to connect the second party to the mobile station. Of course, adding the second party to the three-way call also typically uses the resources of the landline or wireless network serving the second party. Because of the use of additional resources, wireless telecommunications networks often charge subscribers extra for three-way calling.

SUMMARY

In a first principal aspect, an exemplary embodiment of the present invention provides a method of facilitating wireless communication between a mobile station and a landline station. The mobile station is able to send and receive calls via a wireless telecommunications network, and the landline station is able to send and receive calls via a landline telecommunications network. In accordance with the method, the mobile station wirelessly transmits a bridging signal to a transceiver independently of the wireless telecommunications network. The transceiver is communicatively coupled to the landline telecommunications network. In response to the bridging signal, the landline station is alerted independently of the landline telecommunications network. A user may answer the alert by taking the landline station off-hook, at which point a wireless communication link between the mobile station and the landline station may be established independently of the landline and wireless telecommunications networks.

In a second principal aspect, an exemplary embodiment of the present invention provides a method of facilitating wireless communication between a mobile station and a landline station. The mobile station is able to send and receive calls via a wireless telecommunications network, and the landline station is able to send and receive calls via a landline telecommunications network. In accordance with the method, a predetermined instruction is received from a user. In response to the predetermined instruction, a wireless communication link is established between the landline station and the mobile station, via a transceiver communicatively coupled to the landline telecommunications network, independently of the landline and wireless telecommunications networks. Thus, if the mobile station is engaged in a call via the wireless telecommunications network, the landline station may be included in the call via the wireless communication link. Similarly, if the landline station is engaged in call via the landline telecommunications network, the mobile station may be included in the call via the wireless communication link.

In a third principal aspect, an exemplary embodiment of the present invention provides a system for facilitating wireless communication between a mobile station and a landline station. The mobile station is able to send and receive calls via a wireless telecommunications network, and the landline station is able to send and receive calls via a landline telecommunications network. The system comprises an antenna, a wireless transmitter communicatively coupled to the antenna, a wireless receiver communicatively coupled to the antenna, a telephone line interface communicatively coupled to the landline telecommunications network, a multiplexer, a controller, and a user interface. The user interface, which is coupled to the controller, enables a user to enter a predetermined instruction. The multiplexer, which is controlled by the controller, selectively interconnects the wireless transmitter, wireless receive, and telephone line interface. The system provides a first communication pathway for communicatively coupling the landline station to the landline telecommunications network and a second communication pathway for communicatively coupling the mobile station with the landline station, via a wireless communication link, independently of the landline telecommunications network. In response to the predetermined instruction, the system wirelessly transmits a bridging signal to the mobile station, independently of the wireless telecommunications network.

DETAILED DESCRIPTION OF EXEMPLARY EMBODIMENTS

The present invention, in its preferred embodiments, provides a "home zone" within which a mobile station may wirelessly bridge with a landline station, independently of both the wireless telecommunications network and the landline telecommunications network. In this way, the mobile station and the landline station may communicate without using the resources of the wireless and landline networks. The mobile station may add the landline station as a third party to a call, or the landline station may add the mobile station as a third party to a call, without using additional network resources.

In an exemplary embodiment, the "home zone" is defined by the wireless coverage area (which may be on the order of 100 meters) of a transceiver that is communicatively coupled to the landline telecommunications network. The transceiver may be a cordless base unit, and the landline station may be a cordless handset of the cordless base unit. The mobile station, while engaged in a call via a wireless telecommunications network, may wirelessly transmit a bridging signal to the transceiver, in order to include the landline station in the call independently of the landline telecommunications network. While the landline station is engaged in a call via the landline telecommunications network, the transceiver may wirelessly transmit a bridging signal to the mobile station, in order to include the mobile station in the call independently of the wireless telecommunications network.

1. Exemplary Architecture

Figure 1:
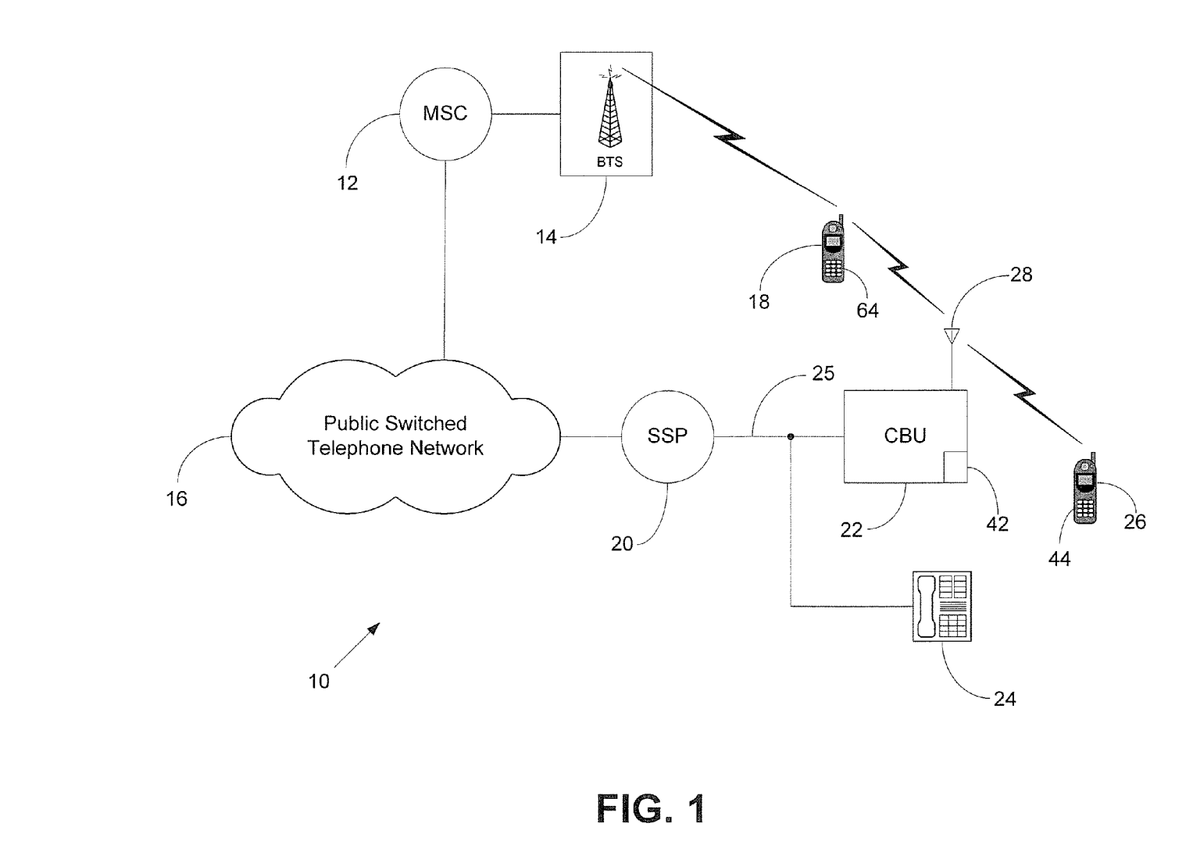
FIG. 1 is a simplified block diagram of a telecommunications system, in accordance with an exemplary embodiment of the present invention.

Referring to the drawings, FIG. 1 is a simplified block diagram of an exemplary telecommunications system 10 in which exemplary embodiments of the present invention may be employed. System 10 includes a wireless telecommunications network, exemplified by a mobile switching center (MSC) 12 and a base transceiver station (BTS) 14. MSC 12 may be connected to the public switched telephone network (PSTN) 16. BTS 14 may be connected to MSC 12, in many cases via a base station controller (BSC) and/or other networks or systems. BTS 14 provides a wireless coverage area, within which BTS 14 may communicate with one or more mobile stations, such as mobile station 18, over an air interface. Mobile station 18 may be a wireless telephone, a wirelessly equipped personal digital assistant (PDA), or other wireless device. The wireless communication between BTS 14 and mobile station 18 may occur in cellular or PCS frequency band, and it may occur in a digital format, such as CDMA, TDMA, GSM, or 802.11x, or in an analog format, such as AMPS. In this way, mobile station 18 is able to use the wireless telecommunications network, comprising MSC 12 and BTS 14, to send and receive calls.

PSTN 16 is also connected to a landline telecommunications network, which may include one or more service switching points (SSPs), such as SSP 20. SSP 20, in turn, may be connected to a plurality of landline stations, which may be located in customers' premises, such as homes or businesses. In the example shown in FIG. 1, the customer's premises includes a cordless base unit (CBU) 22 and a wireline telephone 24 connected to SSP 20, via a telephone line 25. CBU 22, in turn, may communicate with one or more cordless handsets, such as cordless handset 26. Thus, cordless handset 26 and wireline telephone 24 are landline stations on telephone line 25 and may use the landline telecommunications network (exemplified by SSP 20), to send and receive calls.

CBU 22 includes an antenna 28 that provides a cordless-wireless coverage area, within which CBU 22 can communicate with cordless handset 26 over an air interface. CBU 22 may use a cordless telephone frequency band, such as the 2.4 GHz cordless telephone frequency band, for cordless-wireless communications with handset 26. Alternatively, CBU 22 may use some other frequency band, which may or may not be a cordless telephone frequency band. The cordless-wireless communications between CBU 22 and handset 26 may be encrypted. For example, the cordless-wireless communications may use a digital spread spectrum (DSS) technology, such as frequency-hopping. Moreover, CBU 22 may be able to communicate with a plurality of cordless handsets by using distinct cordless-wireless channels for each handset. For example, CBU 22 may have access to eight cordless-wireless channels and, thus, be able to communicate with eight cordless handsets. The cordless-wireless channels may be defined, for example, by different frequencies, different time slots, and/or different spreading codes.

Within the cordless-wireless coverage area provided by antenna 28, CBU 22 may also use one of its available cordless-wireless channels to communicate with mobile station 18 over an air interface. Moreover, CBU 22 may be able to selectively provide two different types of communication pathways for mobile station 18. In particular, CBU 22 may provide a first communication pathway to communicatively couple mobile station 18 and/or cordless handset 26 to telephone line 25. CBU 22 may also be able to provide a second communication pathway to communicatively couple mobile station 18 with cordless handset 26 (via a wireless communication link), independently of the landline telecommunications network. In this way, CBU 22 may wirelessly bridge mobile station 18 with cordless handset 26 without involving the landline network. Moreover, as described in more detail below, this wireless bridging may occur while mobile station 18 is engaged in a call via the wireless telecommunications network and/or while cordless handset 26 is engaged in a call via the landline telecommunications network.

Figure 2:
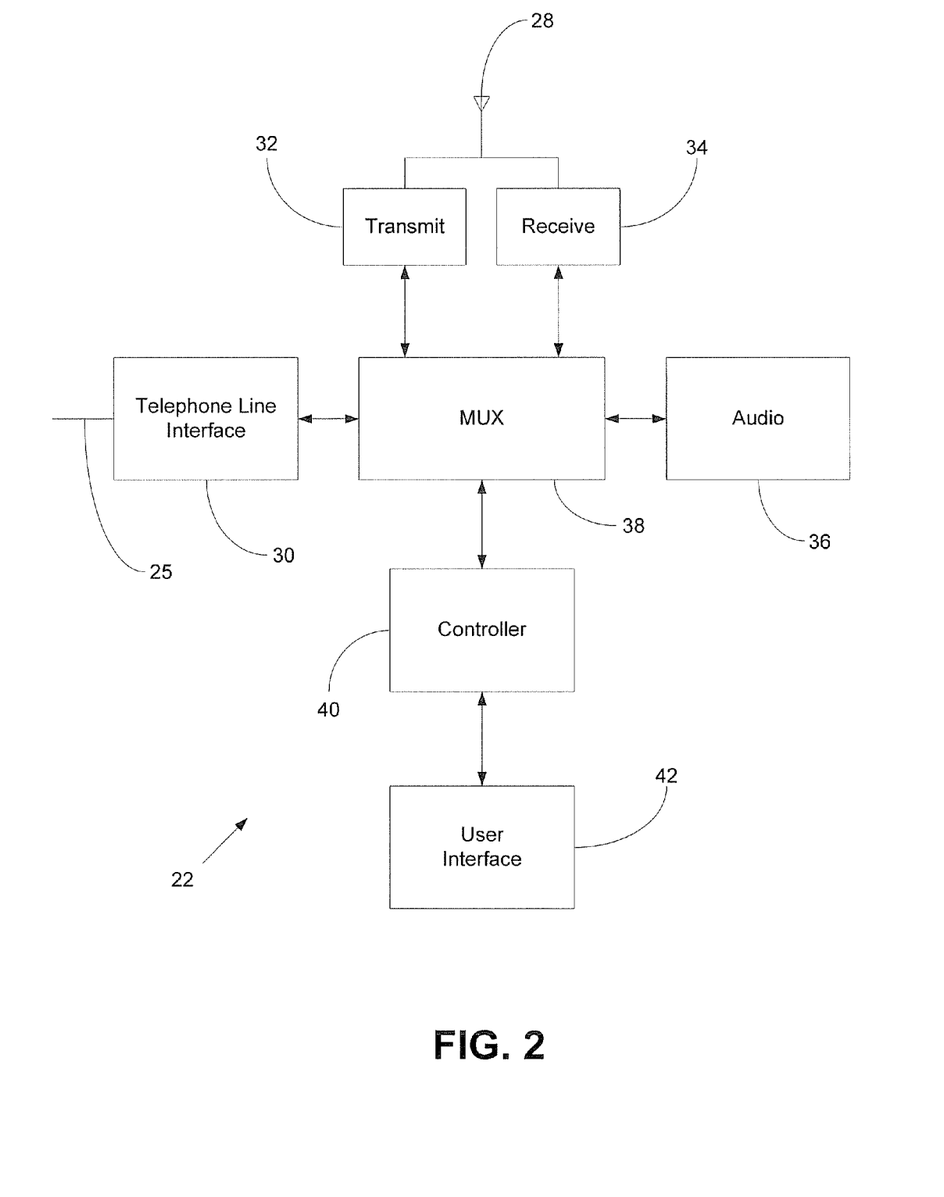
FIG. 2 is a simplified block diagram of a cordless base station, in accordance with an exemplary embodiment of the present invention.

FIG. 2 illustrates an exemplary CBU 22 in more detail. CBU 22 is connected to telephone line 25 via a telephone line interface 30. Antenna 28 may be connected to a transmit system 32 and a receive system 34. CBU 22 may also include an audio block 36, which may include one or more speakers, microphones, codes, and/or other audio components. A multiplexer (MUX) 38 may be connected to telephone line interface 30, transmit system 32, receive system 34, and audio block 36, so as to selectively interconnect these components. MUX 38 may use time domain multiplexing and/or other types of multiplexing.

For example, MUX 38 may connect transmit system 32 and receive system 34 to telephone line interface 30. In this way, CBU 22 may provide a communication pathway to communicatively couple mobile station 18 and/or cordless handset 26 with telephone 25. Thus, in this configuration, telephone line interface 30 may receive signals over telephone line 25 and send them to transmit system 32, via MUX 38. Transmit system 32 then transmits the signals through antenna 28 to mobile station 18 and/or cordless handset 26, using one or more cordless-wireless channels. Similarly, antenna 28 may receive signals over an air interface from mobile station 18 and/or cordless handset 26, and receive system 34 sends the signals to telephone line interface 30, via MUX 38. Telephone line interface 30 then transmits the signals over telephone line 25.

In another configuration, MUX 38 may connect transmit system 32 to receive system 34, so as to provide a communication pathway to communicatively couple mobile station 18 with cordless handset 26. In this configuration, the communications between CBU 22 and mobile station 18 may occur over an air interface using a first cordless-wireless channel (or channels), and the communications between CBU 22 and cordless handset 26 may occur over an air interface using a second cordless-wireless channel (or channels). Thus, within the cordless-wireless coverage area of CBU 22, mobile station 18 may transmit signals to CBU 22 using the first cordless-wireless channel(s). Receive system 34 receives the signals from mobile station 18, via antenna 28. In this configuration, MUX 38 interconnects receive system 34 and transmit system 32. Thus, transmit system 32 receives the signals from receive system 34 and transmits them through antenna 28 to cordless handset 26, using the second cordless-wireless channel(s). In a similar manner, cordless handset 26 may transmit signals using the second cordless-wireless channel(s). Within CBU 22, receive system 34 receives the signals from cordless handset 26, and transmit system 32 transmits the signals to mobile station 18, using the first cordless-wireless channels. Finally, MUX 38 may connect transmit system 32, receive system 34, and telephone line interface 30 so as to effectively join the two communication pathways. In this way, mobile station 18 and cordless handset 26 may both participate in a call over telephone line 25, as described in more detail below.

MUX 38 may be controlled by a controller 40. Controller 40 may control CBU 22 in accordance with software programmed in CBU 22. For example, controller 40 may include a processor that executes machine language instructions stored in data storage to control MUX 38. Controller 40 may control MUX 38 in accordance with instructions from a user. In particular, CBU 22 may include a user interface 42 coupled to controller 38. User interface 42 may include a keypad, other buttons or controls, a touch screen, a voice recognition system, and/or other user input devices with which a user may enter instructions. User interface 42 may also include a display or other devices to convey information to the user. Controller 40 may receive instructions that a user has input by means of user interface 42. Alternatively, controller 40 may receive user instructions transmitted to CBU 22 over an air interface, such as from cordless handset 26. Controller 40 may then control MUX 38 or other aspects of the operation of CBU 22 in response to the user instructions.

For example, in some embodiments, a user may be able to use user interface 42 and audio block 36 so as to use CBU 22 itself, i.e., without using cordless handset 26, to send and receive calls via telephone line 25. Thus, CBU 22 may be able to act as a landline station, even without a cordless handset, such as cordless handset 26. In other embodiments, CBU 22 may lack the functionality to send and receive calls.

A user may also be able to control CBU 22 to control its wireless communications with mobile station 18. For example, user interface 42 may include a "mobile alert" button that, when pressed, causes CBU 22 to alert mobile station 18 by wirelessly transmitting a bridging signal. Alternatively, user interface 42 may include a keypad or other input device with which the user may enter instructions that cause CBU 22 to transmit the bridging signal to mobile station 18. Alternatively, or additionally, a user may be able to use a keypad 44 or other user interface on cordless handset 26 to cause CBU 22 to alert mobile station 18.

Figure 3:
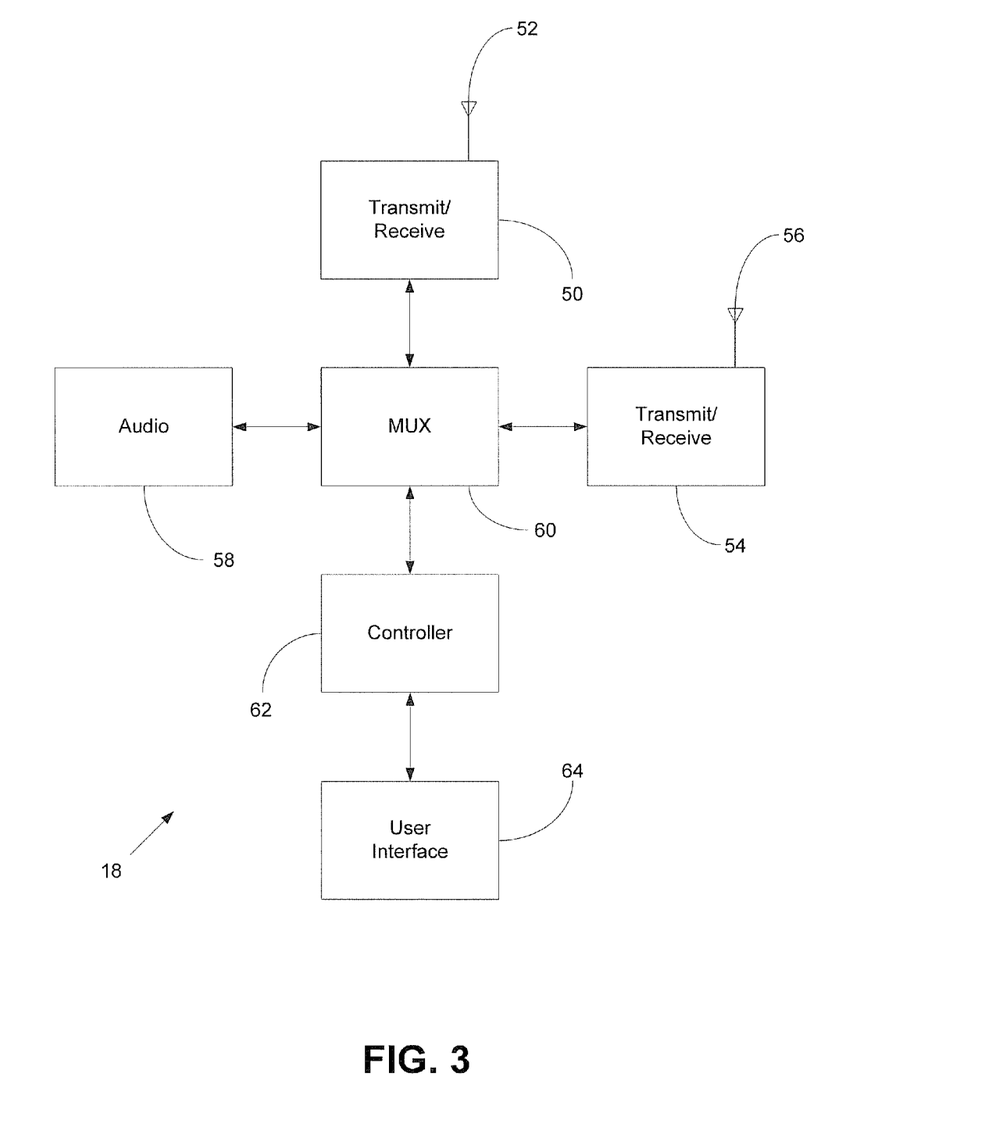
FIG. 3 is a simplified block diagram of a mobile station, in accordance with an exemplary embodiment of the present invention.

FIG. 3 illustrates an exemplary mobile station 18 in more detail. As shown in FIG. 3, mobile station 18 may use separate antennas and separate transmit/receive systems for communicating with BTS 14 and communicating with CBU 22. In particular, mobile station 18 may include a first transmit/receive system 50 connected to a first antenna 52, for communicating with BTS 14, and a second transmit/receive system 54 connected to a second antenna 56, for communicating with CBU 22. In an exemplary embodiment, antenna 52 is an external antenna and antenna 56 is an internal antenna, but other configurations may be used. An audio block 58, which may include one or more speakers, microphones, codecs, and other audio components, may be selectively connected to transmit/receive system 50, transmit/receive system 54, or both, via a multiplexer (MUX) 60. MUX 60, in turn, may be controlled by a controller 62. Controller 62 may control MUX 60 in accordance with software programmed in mobile station 18. For example, controller 62 may include a processor that executes machine language instructions stored in data storage to control MUX 60.

Controller 62 may control MUX 60 in accordance with user instructions entered by a user interface 64. User interface 64 may include a keypad with a plurality of keys with which the user may input alphanumeric characters and other symbols, such as "*" and "#". The keypad may also include one or more function keys, such as "SEND" and "END". Thus, the user may control aspects of the operation of mobile station 18, such as the connections of MUX 60, by entering appropriate keypad sequences. Alternatively, user interface 64 may include a touch screen, voice recognition system, or other user input devices with which the user may enter instructions to control mobile station 18. User interface 64 may also a display or other devices for conveying information to the user.

Although in the example shown in FIG. 1 cordless base unit 22 is used to wirelessly bridge mobile station 18 with a landline station (e.g, to cordless handset 26), more generally, a transceiver may be used for the wireless bridging. The transceiver may provide a first communication pathway for communicatively coupling the landline telecommunications network (exemplified by SSP 20) to one or more landline stations. The landline stations may, for example, include cordless handsets, wired extensions, and/or other telephony devices. Moreover, a landline station may be integrated into the transceiver. The transceiver may provide a second communication pathway for communicatively coupling mobile station 18 to one or more landline stations, independently of the landline network. In this regard, the transceiver may use an antenna to communicate with mobile station 18, and the transceiver may use the same or a different antenna to communicate with cordless handsets. In addition, although the frequency band that the transceiver uses to communicate with mobile station 18 may be one that is used for cordless telephones, other frequency bands could be used.

2. Exemplary Operation

Figure 4:
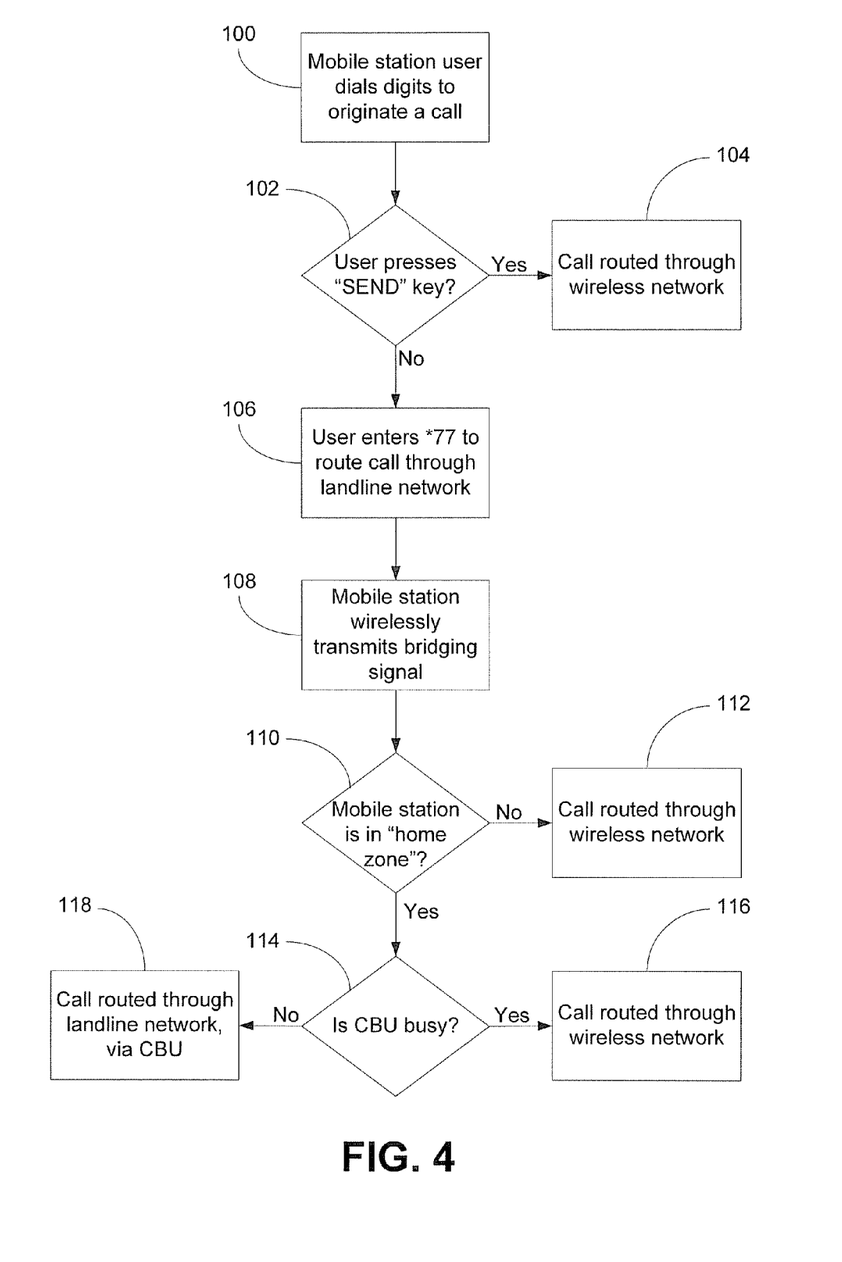
FIG. 4 is a flow chart illustrating the process of the mobile station of FIG. 3 originating a call through a landline telecommunications network, in accordance with an exemplary embodiment of the present invention.
Figure 5:
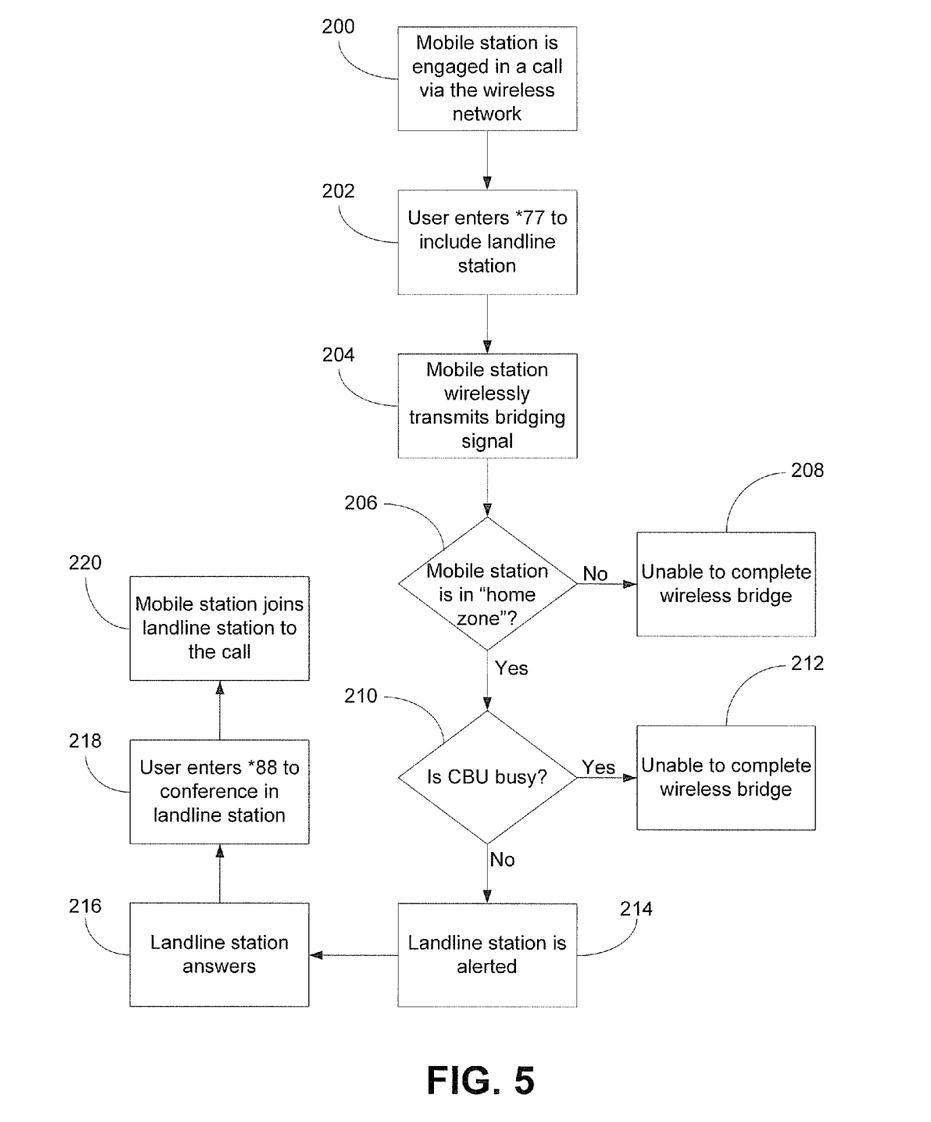
FIG. 5 is a flow chart illustrating the process of the mobile station of FIG. 3 wirelessly bridging to a landline station, in accordance with an exemplary embodiment of the present invention.
Figure 6:
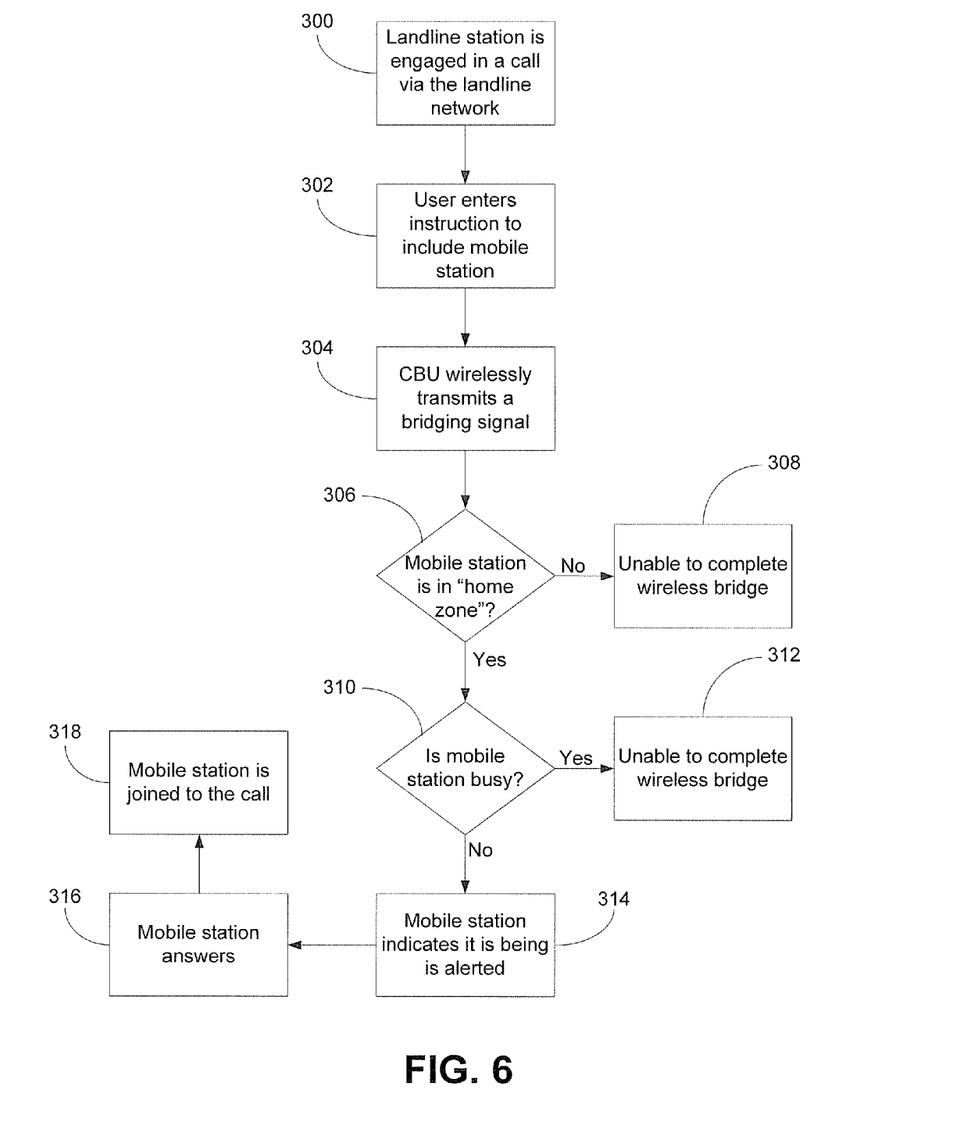
FIG. 6 is a flow chart illustrating the process of a landline station wirelessly bridging to the mobile station of FIG. 3, in accordance with an exemplary embodiment of the present invention.

FIGS. 4 through 6 show examples of wireless bridging between mobile station 18 and CBU 22, using telecommunications system 10, as shown in FIG. 1. In an exemplary embodiment, mobile station 18 is able to originate a call through the landline telecommunications network by wirelessly bridging with CBU 22, as summarized in FIG. 4. The process may begin when the user of mobile station 18 dials digits to originate a call, such as by using a keypad of user interface 64, as indicated by step 100. The user may then have the option of routing the call through either the wireless telecommunications network (exemplified by BTS 14 and MSC 12) or the landline telecommunications network (exemplified by SSP 20) by wirelessly bridging to CBU 22. Thus, whether the call is routed through the wireless network or through the landline network may depend on whether the user presses the "SEND" key, as indicated by step 102. If the user presses the "SEND" key, then mobile station 18 may use antenna 52 to transmit to BTS 14 and, thereby, route the call through the wireless network, as indicated by step 104.

However, the user may have the option of causing mobile station 18 to route the call through the landline network instead, by entering a predetermined instruction, such as by using a keypad of user interface 64 to enter "*77" (or other predetermined keypad sequence), as indicated by step 106. In response to "*77" or other predetermined instruction, mobile station 18 may use antenna 54 to wirelessly transmit a bridging signal, as indicated by step 108. Whether mobile station 18 is able to wirelessly bridge to CBU 22 in this way, may depend on whether mobile station 18 is within the "home zone," as indicated by step 110. As noted above, the "home zone" may be defined by the wireless coverage area provided by antenna 28 of CBU 22. If mobile station 18 is not within the "home zone," i.e., is out of range for successful wireless communication with CBU 22, then mobile station 18 may instead route the call through the wireless network, as indicated by step 112. In this regard, mobile station 18 may include an antenna strength indicator to indicate the proximity of mobile station 18 to CBU 22. For example, the antenna strength indicator may be an icon displayed on a display of user interface 64. If mobile station 18 is out of range, then mobile station 18 may instead originate the call through the wireless network automatically, or mobile station 18 may provide the user with one or more alternative options.

Whether mobile station 18 is able to wirelessly bridge to CBU 22 may also depend on whether CBU 22 is busy, as indicated by step 114. CBU 22 may be busy because the telephone line to SSP 20 is being used by either cordless handset 26 or wireline telephone 24. However, if CBU 22 has access to more than one telephone line to SSP 20, then CBU 22 may be able to complete the wireless bridge with mobile station 18, even though cordless handset 26 or wireline telephone 24 is engaged in a call.

If CBU 22 is busy, then mobile station 18 may instead route the call through the wireless network, as indicated by step 116. Mobile station 18 may do this automatically, or mobile station 18 may provide the user with one or more alternative options. In addition, if CBU 22 is busy, mobile station 18 may, but need not, provide a "busy" indication to the user.

If CBU 22 is not busy, then mobile station 18 may successfully complete the wireless bridge with CBU 22 and may originate the call through the landline network (exemplified by SSP 20) via CBU 22, as indicated by step 118. At that point, mobile station 18 may act like any other cordless extension in communication with CBU 22. Thus, other extensions connected to the telephone line to SSP 20, such as cordless handset 26 and wireline telephone 24, may join in on the call.

In addition, while mobile station 18 uses one line for the call via the landline network, as described above, mobile station 18 may also be able to use a second line to originate or receive a call via the wireless network. Moreover, the mobile station user may be able to join the two calls together within mobile station 18, by entering a predetermined instruction, such as "*88" or some other keypad sequence. In this way, mobile station 18 may be able to engage in three-way calling without using additional resources of the wireless network, e.g., an additional wireless channel.

In an exemplary embodiment, mobile station 18 is able to wirelessly bridge with a landline station, such as cordless handset 26, in order to include the landline station in a call carried by the wireless telecommunications network, as summarized in FIG. 5. The process may begin with mobile station 18 engaged in a call via the wireless network (exemplified by BTS 14 and MSC 12), as indicated by step 200. Mobile station 18 may have either originated or received the call. Mobile station 18 may use antenna 52 for communicating with BTS 14 for this call.

To include a landline station, such as cordless handset 26, in the call, the mobile station user may enter a predetermined instruction, such as by using a keypad of user interface 64 to enter "*77" or other keypad sequence, as indicated as step 202. In response, mobile station 18 wirelessly transmits a bridging signal, as indicated by step 204. Mobile station 18 may use a different antenna for transmitting the bridging signal than for communicating with BTS 14. Thus, if mobile station 18 uses antenna 52 to communicate with BTS 14, mobile station 18 may use antenna 56 to transmit the bridging signal.

Whether mobile station 18 is able to complete the wirelessly bridge, may depend on whether mobile station 18 is within the "home zone," as indicated by step 206. If mobile station 18 is not within the "home zone," then mobile station 18 may be unable to complete the wireless bridge, as indicated by step 208. As noted above, mobile station 18 may include an antenna strength indicator to indicate the proximity to CBU 22, i.e., whether mobile station 18 is within the "home zone" provided by CBU 22. However, mobile station 18 may provide alternative indications to the user that mobile station 18 is out of range. Whether mobile station 18 is able to complete the wireless bridge may also depend on whether CBU 22 is busy, as indicated by step 210. If CBU 22 is busy, then mobile station 18 may be unable to complete the wireless bridge, as indicated by step 212. If CBU 22 is busy, then mobile station 18 may, but need not, provide a "busy" indication to the user.

If mobile station 18 is within the "home zone" and CBU 22 is not busy, then mobile station 18 may be able to complete the wireless bridge. In response to the bridging signal from mobile station 18, CBU 22 alerts the landline station, as indicated by step 214. The alert may involve "ringing" cordless handset 26 and/or CBU 22, particularly if CBU 22 can itself function as a landline station. More generally, the alert may involve a visible indication, such as a flashing light or displaying text or graphics, a tactile indication, such as a vibration, an audible indication, such as ringing, beeping, or buzzing, or some other type of user-discernible indication from cordless handset 26 and/or CBU 22. Moreover, this alert occurs independently of the landline communications network (exemplified by SSP 20). In particular, the alert is generated or initiated by CBU 22, rather than by SSP 20.

A landline station user may then answer the alert, as indicated by step 216, such as by causing CBU 22 and/or cordless handset 26 to go off-hook. At that point, a wireless communication link is established between mobile station 18 and the landline station, e.g., cordless handset 26. Moreover, this wireless communication link is established independently of the landline network (exemplified by SSP 20). In particular, CBU 22 communicatively couples mobile station 18 with the landline station without involving the landline network.

With the wireless communication link to the landline station established, the mobile station user may carry on the conversations on the two lines independently, e.g., by alternating between the two lines. However, the mobile station user may also be able to conference the two lines together, such as by entering "*88" on a keypad of user interface 64, as indicated by step 218. In response to the "*88" or other keypad instruction, mobile station 18 conferences the two lines together, e.g., by using MUX 60. In this way, the landline station is joined to the call being carried by the wireless network, as indicated by step 220.

Although in the process summarized in FIG. 5 mobile station 18 is engaged in a wireless network call before transmitting the wireless bridging signal, the wireless network call could occur afterward. Thus, mobile station 18 may first establish the wireless communication link with the landline station and then either originate or receive a call via the wireless telecommunications network.

Beneficially, this process of establishing the wireless communication link between mobile station 18 and the landline station occurs independently of the landline network. In this way, mobile station 18 may include a the landline station as a third party to a call without using the resources of the landline network and without using additional resources (e.g., an additional wireless channel) of the wireless network.

In an exemplary embodiment, a landline station, such as CBU 22 and/or cordless handset 26, is able to wirelessly bridge with mobile station 18, in order to include mobile station 18 in a call carried by the landline telecommunications network, as summarized in FIG. 6. The process may begin with the landline station engaged in a call via the landline network (exemplified by SSP 20), as indicated by step 300. To include mobile station 18 in the call, the landline station user may enter a predetermined instruction, such as by using user interface 42, as indicated by step 302. For example, the user may press a "mobile alert" button of user interface 42, or the user may use a keypad of user interface 42 to enter a keypad sequence, such as *77 or *78. In this regard, the user may enter different instructions to contact different types of mobile stations or to contact a selected one of a plurality of mobile stations within the "home zone." For example, the user may enter *77 to contact a mobile station from one manufacturer and may enter *78 to contact a mobile station from another manufacturer. The user may also be able to enter the predetermined instruction remotely, such as by using keypad 44 or other user interface of cordless handset 26. In response to the user's instructions, CBU 22 wirelessly transmits a bridging signal, as indicated by step 304.

Whether CBU 22 is able to complete the wireless bridge to mobile station 18 may depend on whether mobile station 18 is within the "home zone," as indicated by step 306. If mobile station 18 is not within the "home zone," then CBU 22 may be unable to complete the wireless bridge with mobile station 18, as indicated by step 308. CBU 22 and/or cordless handset 26 may, but need not, provide an "out of range" indication to the landline station user. Whether CBU 22 can wirelessly bridge to mobile station 18 may also depend on whether mobile station 18 is busy, as indicated by step 310. In this regard, if mobile station 18 is a two-line mobile station, then mobile station 18 may not be busy even if already engaged in a call, e.g., a call carried by the wireless telecommunications network. If mobile station 18 is busy, then CBU 22 may be unable to complete the wireless bridge, as indicated by step 312. CBU 22 and/or cordless handset 26 may, but need not, provide a "busy" indicate to the landline station user.

In response to the bridging signal, mobile station 18 may provide a user-discernible indication that mobile station 18 is being alerted, as indicated by step 314. The user-discernible indication may involve a visible indication, such as a flashing light or displaying text or graphics, a tactile indication, such as a vibration, an audible indication, such as ringing, beeping, or buzzing, or some other type of user-discernible indication. The mobile station user may then answer, as indicated by step 316. At that point, a wireless communication link is established between mobile station 18 and the landline station, and mobile station 18 may act like a cordless extension of CBU 22. Thus, mobile station is joined to the call being carried by the landline telecommunications network, as indicated by step 318.

Moreover, if mobile station 18 is already engaged in a call on another line, e.g., a call carried by the wireless network, then the mobile station user may be able to conference the two calls together within mobile station 18. On the other hand, if mobile station 18 has another line available, then mobile station 18 may be able to originate or receive a call via the wireless network and then join that call to the call being carried by the landline network.

Although in the process summarized in FIG. 6 the landline station is engaged in a landline network call before CBU 22 transmits the wireless bridging signal, the landline network call could occur afterward. Thus, CBU 22 may first establish the wireless communication link with mobile station 18 and then either originate or receive a call via the landline telecommunications network.

Beneficially, this process of establishing the establishing the wireless communication link between mobile station 18 and the landline station occurs independently of the landline and wireless networks. In this way, the landline station may add mobile station 18 as a third party to a call without using the resources of the wireless network and without using additional resources (e.g., an additional telephone line) of the landline network.

3. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method of facilitating wireless communication between a mobile station and a landline station, said mobile station being able to send and receive calls via a wireless telecommunications network, said landline station being able to send and receive calls via a landline telecommunications network, said method comprising:

while said mobile station is engaged in a call via said wireless telecommunications network, said mobile station receiving a first predetermined instruction from a user of said mobile station;

in response to said first predetermined instruction, establishing a wireless communication link between said landline station and said mobile station, via a transceiver having a landline connection to said landline telecommunications network, independently of said landline telecommunications network and said wireless telecommunications network;

after said wireless communication link is established, said mobile station receiving a second predetermined instruction from said user; and in response to said second predetermined instruction, joining said landline station as a third party to said call, wherein said call is carried by said wireless telecommunications network.

2. The method of claim 1, wherein establishing a wireless communication link comprises:

said mobile station transmitting a wireless bridging signal.

3. The method of claim 2, wherein establishing a wireless communication link further comprises:

said transceiver receiving said wireless bridging signal; and in response to said wireless bridging signal, said transceiver alerting said landline station independently of said landline telecommunications network.

* * * * *